United States Patent [19]

Budnik et al.

[11] Patent Number: 5,145,879

[45] Date of Patent: Sep. 8, 1992

[54] SURFACTANTS FOR MANUFACTURE OF URETHANE FOAMS

[75] Inventors: Richard A. Budnik, Mount Kisco, N.Y.; Charles H. Blevins, II, San Jose, Calif.; Gerald J. Murphy, Wappingers Falls, N.Y.; Wojciech Grabowski, Versoix, Switzerland; Raymond L. Cobb, Buda, Tex.

[73] Assignee: Union Carbide Chemicals & Plastics Technology Corporation, Danbury, Conn.

[21] Appl. No.: 636,638

[22] Filed: Dec. 31, 1990

[51] Int. Cl.$^5$ ............................................. C08G 18/00
[52] U.S. Cl. ................................. 521/112; 252/351; 528/25; 528/29; 528/31; 556/445
[58] Field of Search ............... 521/112; 528/25, 29, 528/31; 556/445; 252/351

[56] References Cited

U.S. PATENT DOCUMENTS

| | | | |
|---|---|---|---|
| 3,779,956 | 12/1973 | Morehouse | 260/2.5 |
| 3,935,123 | 1/1976 | Prokai et al. | 252/351 |
| 4,147,846 | 4/1979 | Schweiger | 521/112 |
| 4,687,786 | 8/1987 | Kollmeier et al. | 521/112 |
| 4,814,409 | 3/1989 | Blevins et al. | 521/112 |

OTHER PUBLICATIONS

Article by Murphy et al. in the Journal of Cellular Plastics, Jan./Feb., pp. 56-59 (1982).
Article by Jones and Fesman in the Journal of Cellular Plastics, 1, 3-19 (1965).

*Primary Examiner*—Maurice J. Welsh
*Assistant Examiner*—Rachel Johnson
*Attorney, Agent, or Firm*—William F. Gray

[57] ABSTRACT

Silicone surfactants having a siloxane backbone and a mixture of high and low atomic mass oxyalkylene pendant groups, these polyether pendants having average atomic masses of 1500-6000 and 300-750 respectively. The surfactants of the invention operate in polyurethane foam compositions to provide stable foams over a range of surfactant concentrations while still producing product foams having relatively constant breathability. Also disclosed and claimed are polyurethane foam compositions which include the surfactants, a method of making polyurethane foam using the surfactants, and polyurethane foam made by the method.

13 Claims, No Drawings

SURFACTANTS FOR MANUFACTURE OF URETHANE FOAMS

FIELD OF THE INVENTION

This invention relates to silicone surfactants, and more particularly to silicone surfactants having a siloxane backbone and oxyalkylene pendant groups of both high and low atomic masses, which surfactants provide a combination of good potency and good processing latitude in urethane foam production.

BACKGROUND OF THE INVENTION

In polyurethane foam manufacturing, surfactants are needed to stabilize the foam until the product-forming chemical reaction is sufficiently complete so that the foam supports itself and does not suffer objectionable collapse.

High potency surfactants, generally understood to be those which give a high height of rise and little top collapse, are desirable, because foams which collapse to a substantial degree before setting have high densities and objectionable density gradients.

Surfactants are relatively expensive. Accordingly, processors prefer to use as little as possible, employing only as much as required for desired performance. Processors also desire that the properties of the final product be relatively constant as a function of the amount of surfactant used, so that surfactant levels can be varied in the manufacturing process to give good processing, without greatly affecting the properties of the product.

Silicone surfactants for polyurethane foam manufacture typically are materials having siloxane backbones and polyether pendant groups. They are of two types, nonhydrolyzable and hydrolyzable. The nonhydrolyzable surfactants, in which the polyether pendant groups are attached to the siloxane backbone by Si—C bonds, are generally believed to have high potency but to produce "tight" foams with poor breathability. Hydrolyzable surfactants, in which the polyether pendant groups are attached to the siloxane backbone by Si—bonds, are generally believed to have poor potency but to offer good processing characteristics, and to produce foams with good breathability.

Some investigators are now questioning such generalizations and are attempting to discover silicone surfactants which have high potency, provide good processing characteristics, and produce foams having good breathability, by varying the structure of the surfactant appropriately.

Examples of such materials are described in U.S. Pat. No. 4,147,847. This patent describes certain siloxane-oxyalkylene copolymer silicone surfactants having ratios of $(CH_3)_2SiO_{2/2}$ units to $(CH_3)(R)SiO_{2/2}$ units in the range of 3.5:1 to 15:1, for use in flame retardant polyurethane compositions. Other examples are surfactants having cyclic siloxane pendant groups as well as polyether pendants, described in U.S. Pat. No. 4,855,379.

It would be desirable to have nonhydrolyzable silicone surfactants which have high potency, offer good processing characteristics, produce foams having good breathability, and which function well in flame retardant formulations. Such surfactants are the subject of the present application.

SUMMARY

The present invention provides nonhydrolyzable silicone surfactants which offer good potency, and desirable processing characteristics in that they offer generally flat breathability profiles as the surfactant level is varied in the polyurethane foams produced with them. They are particularly useful in flame retardant polyurethane foam compositions.

The surfactants of this invention are compositions of matter having the generalized average formula $$M^*D_xD''_yM^*$$

wherein
  $M^*$ represents $(CH_3)_3SiO_{1/2}$ or $R(CH_3)_2SiO_{1/2}$;
  D represents $(CH_3)_2SiO_{2/2}$;
  D'' represents $(CH_3)(R)SiO_{2/2}$;
  x is 40–80; and y is 5–20.

In the above formulae for $M^*$ and D'', R is a polyether-containing substituent derived from a $C_nH_{2n}$-started polyether and is selected from the group consisting of:

(1) $-C_nH_{2n}O(C_2H_4O)_a(C_3H_6O)_bR''$ moieties having average atomic masses in the range 1500–6000, and wherein
  n is 3–4;
  a is a number such that ethylene oxide residues constitute 30–50% by weight of the alkylene oxide residues of the polyether;
  b is a number such that propylene oxide residues constitute 70–50% by weight of the alkylene oxide residues of the polyether;
  R'' represents H, an alkyl group of 1–4 carbon atoms, or $-C(O)CH_3$; and (2) $-C_{n'}H_{2n'}O(C_2H_4O)_{a'}(C_3H_6O)_{b'}R''$ moieties having average atomic masses in the range 300–750, and wherein
  n' is 3–4;
  a' is 0 to a number such that ethylene oxide residues constitute 100% by weight of the alkylene oxide residues of the polyether; and
  b' is 0 to a number such that propylene oxide re idues constitute 100% by weight of the alkylene oxide residues of the polyether;
  with the proviso that at least one of a' and b' must be finite; and
  R'' is as defined above.

Further, the surfactant compositions $M^*D_xD''_yM^*$ of the invention contain polyether-containing substituents R having average atomic masses in the range 1500–6000 and polyether-containing substituents R having average atomic masses in the range 300–750, and the overall average atomic mass of the $C_nH_{2n}$-started polyethers from which the polyether-containing substituents R in the compositions $M^*D_xD''_yM^*$ are derived is in the blend average molecular weight range 1000–1800.

The invention also relates to polyurethane foam compositions comprising:
(a) a polyether polyol containing an average of more than two hydroxyl groups per molecule;
(b) an organic diisocyanate;
(c) at least one catalyst for production of polyurethane foam;
(d) a blowing agent; and
(e) a siloxane-oxyalkylene copolymer surfactant as defined above.

The invention further relates to a method of preparing a polyurethane foam by the steps of (1) preparing a mixture comprising:
  (a) a polyether polyol containing an average of more than two hydroxyl groups per molecule;
  (b) an organic diisocyanate;
  (c) at least one catalyst for production of polyurethane foam;
  (d) a blowing agent; and
  (e) a siloxane-oxyalkylene copolymer surfactant as defined above;
(2) allowing the mixture to foam; and
(3) curing the foamed composition.

The invention also relates to polyurethane foam produced using the above-described method.

DETAILED DESCRIPTION

Within the broad range of compounds of the invention as defined above are a number of preferred materials. A first preferred material has the general average formula $M^*D_{41-45}D''_{5.5-10}M^*$. A most preferred material within this class has the general average formula $M^*D_{43}D''_{6.8}M^*$. A second preferred material has the general average formula $M^*D_{58-62}D''_{7.5-15}M^*$, and a most preferred material within this class has the general average formula $M^*D_{60}D''_{15}M^*$. A third preferred material has the general average formula $M^*D_{63-67}D''_{8-16}M^*$, and a most preferred material within this class has the general average formula $M^*D_{65}D''_{8-10}M^*$.

The polyether-containing substituents R having average atomic masses in the range 1500–6000 are preferably $-C_3H_6O(C_2H_4O)_a(C_3H_6O)_bR''$ moieties containing approximately 40% by weight of ethylene oxide residues and having average atomic masses of approximately 4000, or $-C_3H_6O(C_2H_4O)_a(C_3H_6O)_bR''$ moieties containing approximately 40% by weight of ethylene oxide residues and having average atomic masses of approximately 3200. In the materials having average atomic masses of approximately 4000, R'' is preferably $-C(O)CH_3$, while in the materials having average atomic masses of approximately 3200, R'' is preferably $-CH_3$.

The polyether-containing substituents R having average atomic masses in the range 300–750 are preferably $-C_3H_6O(C_2H_4O)_a(C_3H_6O)_oR''$ moieties containing no propylene oxide residues and having average atomic masses in the range 300–750, or $-C_3H_6O(C_2H_4O)_a(C_3H_6O)_bR''$ moieties containing approximately 40% by weight of ethylene oxide residues and having average atomic masses in the range 400–600. In these low atomic mass materials, R'' is preferably $-C(O)CH_3$ or $CH_3$.

The overall average atomic mass of the $C_nH_{2n}$-started polyethers from which the polyether-containing substituents R in the composition $M^*D_xD''_yM^*$ are derived is preferably in the blend average molecular weight range 1100–1400.

Procedures for synthesizing nonhydrolyzable silicone surfactants having polyalkylene oxide pendant groups are well known. Representative disclosures are provided in U.S. Pat. Nos. 4,147,847 and 4,855,379, relevant portions of which are hereby incorporated by reference.

Typically, the surfactants of the invention are prepared by causing a polyhydridosiloxane of generalized average formula $M^{}D_xD'_yM^{}$ to react with an appropriately chosen blend of allyl-started oxyalkylene polymers in the presence of a hydrosilation catalyst such as chloroplatinic acid. In the formula for the polyhydridosiloxane, $M^{**}$ is $(CH_3)(H)SiO_{1/2}$ or $(CH_3)_3SiO_{1/2}$, D is as defined above, and D' represents $(CH_3)(H)SiO_{2/2}$. The allyl-started oxyalkylene polymers are polyethers having a terminal vinyl group, which may optionally be 2-substituted, and containing multiple units derived from ethylene oxide, propylene oxide, or both. The reagents are mixed, generally in a solvent such as toluene or dipropylene glycol, heated to about 70°–85° C., then the catalyst is added, a temperature rise of about 10–15° C. is observed, and the mixture is finally sampled and analyzed for SiH groups by adding an alcohol and base and measuring evolved hydrogen. If a volatile solvent was used, this is removed under vacuum, and the mixture is generally neutralized with a weak base such as $NaHCO_3$, then filtered.

The polyhydridosiloxanes of generalized average formula $M^{}D_xD'_yM^{}$ are prepared in the manner known to the art. For the case in which $M^{}$ is $(CH_3)_3SiO_{1/2}$, an alkyldisiloxane such as hexamethyldisiloxane, a polyhydridosiloxane polymer, and an alkyl cyclosiloxane such as octamethylcyclotetrasiloxane are reacted in the presence of a strong acid such as sulfuric acid. For the case in which $M^{}$ is $(H)(CH_3)_2SiO_{2/2}$, a hydridoalkyldisiloxane such as dihydridotetramethyldisiloxane, a polyhydridosiloxane polymer, and an alkyl cyclosiloxane such as octamethylcyclotetrasiloxane are reacted in the presence of a strong acid such as sulfuric acid.

The allyl-started oxyalkylene polymers, also referred to as polyethers, are likewise prepared in the manner known to the art. An allyl alcohol, optionally bearing a substituent on the 1 or 2- position, is combined with ethylene oxide, propylene oxide, or both, in the presence of an acid or a base, to yield the desired polyether with a terminal hydroxyl group. This is typically capped by further reaction with an alkylating or acylating agent such as a methyl halide or acetic anhydride, respectively. Other end caps may of course be employed.

The surfactants of the invention are employed in the manufacture of polyurethane foam in the manner known to the art. In producing the polyurethane foams using the surfactants of this invention, one or more polyether polyols is employed for reaction with a polyisocyanate reactant to provide the urethane linkage. Such polyols have an average of at least slightly above 2 and typically 2.1 to 3.5 hydroxyl groups per molecule. They typically also include compounds which consist of carbon, hydrogen, and oxygen, and compounds which may also contain phosphorus, halogen, and/or nitrogen. Such polyether polyols are well known in the art and are commercially available The organic polyisocyanates that are useful in producing polyether polyurethane foams in accordance with the teachings of this invention are also well known in the art, and are organic compounds that contain at least two isocyanate groups. Any such compounds or mixtures thereof can be employed. The toluene diisocyanates are among many suitable isocyanates which are commercially used in the preparation of polyurethane foams.

The urethane foaming reaction is usually effected in the presence of a minor amount of a catalyst, preferably an amine catalyst and usually a tertiary amine.

It is also preferred to include a minor amount of certain metal catalysts in addition to the amine catalyst in the components of the reaction mixture. Such supplementary catalysts are well known to the art of polyether-based polyurethane foam manufacture. For example, useful metal catalysts include organic derivatives of tin, particularly tin compounds of octanoic acid. Blowing agents such as water are typically employed to generate carbon dioxide in situ. Additional blowing agents which are vaporized by the exotherm of the reaction are also commonly employed.

Other additives may of course be employed to impart specific properties to the foam. Examples are materials such as flame retardants, and Geolite Modifier 90M, which allows one to use reduced levels of alternate blowing agents.

The polyether-based polyurethane foams of this invention may be formed in accordance with any of the processing techniques known to the art, such as, in particular, the "one shot" technique. In accordance with this method, foamed products are provided by carrying out the reaction of the polyisocyanate and polyether polyol simultaneously with the foaming operation. It is sometimes convenient to add the surfactant to the reaction mixture as a premixture with one or more of the blowing agents, polyether, polyol, and catalyst components.

It is to be understood that the relative amounts of the various components of the foam formulation are not narrowly critical. The polyether polyol and polyisocyanate are present in the foam-producing formulation in a major amount. The relative amounts of these two components in the mixture are well known to the art. The blowing agent, catalyst, and surfactant are each present in a minor amount sufficient to foam the reaction mixture. The catalyst is present in a catalytic amount, i.e., that amount necessary to catalyze the reactions to produce the urethane at a reasonable rate, and the surfactant is present in an amount sufficient to impart the properties desired.

In a typical preparation, the polyether polyol, surfactant, amine catalyst, and blowing agent are mixed together, then stannous octoate is added with stirring, and finally toluene diisocyanate is mixed in and the composition is allowed to foam and polymerize.

The polyurethanes produced in accordance with the present invention can be used in the same areas as conventional polyether polyurethanes. For example, the foams of the present invention can be used with advantage in the manufacture of textile interliners, cushions, mattresses, padding, carpet underlay, packaging, gaskets, sealers, thermal insulators and the like. They are most advantageously used in flame retardant applications.

In the examples which follow, all reactions involving the manipulation of organometallic compounds were performed in an inert atmosphere. Commercial reagents were used without additional purification. All glassware was washed successively with KOH/ethanol, water, dilute HCl, and water, then oven-dried before use. IR spectra were recorded on a Beckman Acculab 4 spectrophotometer. $^{13}$C NMR and $^{29}$Si NMR spectra were obtained using Varian or Brüker spectrophotometers with fourier transform capabilities. NMR samples were prepared by dissolving the samples in either deuterochloroform or perdeuterobenzene containing 0.05M Cr(acac)$_3$ relaxation agent. GC analyses were obtained using a Hewlett Packard Model 5840A gas chrocatograph fitted with 10 ft.×⅛ inch stainless steel columns packed with OV101 on Chromosorb W. The GC was temperature programmed from 75° C. to 350° C. at a rate of 10° C. with an initial temperature hold of 1 minute and a post hold of 20 minutes using a helium carrier gas flow of 30 cc/min.

DEFINITIONS AND IDENTIFICATIONS OF MATERIALS

The following terms are employed herein as defined below. Various materials are also defined below for the convenience of the reader.

The term potency refers to the ability of a surfactant to stabilize foam during its manufacture. High potency surfactants allow high heights of rise and only relatively small amounts of top collapse during foam manufacture.

The phrase processing latitude refers to the ability of a foam composition to tolerate changes in its ingredients or amounts thereof, while still producing product having the desired properties.

The term breathability refers to the ability of a cured foam to permit passage of a gas such as air therethrough. A "tight" foam has low breathability, while an "open" foam is said to have a high breathability and permits ready passage of gas through it.

Flat breathability refers to the property of a surfactant to function in foam compositions at various levels while still producing product foams having relatively constant breathabilities.

Blend average molecular weight (BAMW) is the weighted average molecular weight of the mixture of polyethers, the weighting taking account of the relative amounts of materials in the mixture. The blend average molecular weight is the overall average atomic mass of the polyethers constituting the mixture.

NIAX ® Polyol 16–56 is a proprietary commercial product of Union Carbide Chemicals and Plastics Company, Inc., and has the Chemical Abstracts Registry Number 9082-00-2. California Bulletin 117A burn tests were conducted according to California Technical Bulletin #117, Section A, Part I, Resilient Cellular Materials.

Polycat-77 amine catalyst is a tertiary amine available from Air Products Co.

The compounds designated as UCC&P I, II, III, IV, V, and VI are polyalkyleneoxidemethylsiloxane copolymers.

In accordance with generally-accepted usage, the following symbols are defined as shown:

M refers to $(CH_3)_3SiO_{1/2}$;
M' refers to $(H)(CH_3)_2SiO_{1/2}$;
D refers to $(CH_3)_2SiO_{2/2}$;
D' refers to $(H)(CH_3)SiO_{2/2}$; and
D" refers to $R(CH_3)SiO_{2/2}$, where R is a polyether-containing group.

L-31 is a polyhydridosiloxane polymer having the general formula $MD'_{45-60}M$.

Blowing agent U-11 is trichlorofluoromethane.

NIAX ® catalyst A-1 is a mixture of 2,2'-oxybis(N,N-dimethyl- ethaneamine) and 1,1'-oxybis-2-propanol. The components of the mixture have the Chemical Abstracts Registry Numbers 3033-62-3 and 110-98-5.

Thermolin-101 is a chlorinated phosphate ester product of the Olin Chemical Company, and has the structure tetrakis(2-chloroethyl)ethylene diphosphate. Its Chemical Abstracts Registry Number is 33125-86-9.

Toluene diisocyanate (TDI) was a mixture of approximately 80% of the 2,4- isomer and 20% of the 2,6- isomer, and was used in excess.

Compound A is a proprietary commercial silicone surfactant available from the Dow Corning Chemical Company. It was used for comparison purposes.

Compound B is a commercial polyalkylene oxide polyol of the Dow Chemical Company, and is similar to NIAX® Polyol 16–56, which is a polyethylene-polypropylene glycolglyceryl ether having a Chemical Abstracts Registry Number 9082-00-2.

Compound C is a proprietary polyol available from the Dow Chemical Company.

Compound D is a commercial hydrolyzable alkoxy endblocked non flame retardant silicon surfactant available from the Th. Goldschmidt Company of Germany, and is employed for comparison purposes.

NIAX® Catalyst A-200 is a proprietary product of Union Carbide Chemicals and Plastics Company, Inc., and is a mixture of tertiary amines and a glycol. Its major components have the Chemical Abstracts Registry Numbers 3033-62-3 and 110-98-5.

The following examples illustrate the invention, and are not intended to be limiting.

Preparation of $MD_xD'_yM$ Fluids

A flask, fitted with a magnetic stirring bar and a reflux condenser under a positive pressure of argon, was charged with the desired amounts of hexamethyldisiloxane (MM), octamethylcyclotetrasiloxane (cyclic D4), L-31, and sulfuric acid. The mixture was stirred overnight at ambient temperature, then the sulfuric acid puddle was removed and an excess of sodium bicarbonate was added cautiously to neutralize residual acid. The mixture was treated with decolorizing carbon and then pressure filtered to give the product as a colorless liquid. The amounts of reagents employed in the preparation of several starting materials are shown in Table 1.

TABLE 1

Reagents Used for Preparation of $MD_xD'_yM$ Fluids

| Product | MM (g) | cyclic D4 (g) | L-31 (g) | $H_2SO_4$ (g) |
|---|---|---|---|---|
| $MD_{43}D'_{6.8}M$ | 3.78 | 84.81 | 11.41 | 2.75 |
| $MD_{60}D'_{15}M$ | 7.48 | 282.43 | 60.08 | 5.4 |
| $MD_{65}D'_{8}M$ | 2.54 | 88.22 | 9.24 | 2.75 |
| $MD_{80}D'_{20}M$ | 7.06 | 409.49 | 86.46 | 7.3 |

Preparation of $MD_xD''_yM$ Surfactants

A flask fitted with a mechanical stirrer, a reflux condenser, and a Thermowatch® thermometer was charged under positive argon pressure with the desired $MD_xD'_yM$ fluid, blend of polyethers, and solvent (if used). The mixture was heated to about 80° C. and an ethanol solution of chloroplatinic acid (10 mg Pt/ml) was added. An exotherm of several degrees ensued, after which the reaction was allowed to proceed for approximately one hour. At the end of this time an aliquot typically would show only a trace of residual Si—H. The solution was cooled to room temperature, generally but not always neutralized with sodium bicarbonate, then pressure filtered to yield the product or solution thereof. When volatile solvent was employed, this was removed in vacuuo to give the product, which was generally analyzed by GPC, $^{13}C$ NMR, and $^{29}Si$ NMR. The analytical results were consistent with the expected structures.

The surfactants listed in Table 2 below were prepared using the above general procedure.

TABLE 2

Specifics of Surfactant Syntheses

| No. | Structure | g SiH Fluid[a] | Polyethers BAMW[b] | grams | Blend[c] | Solvent[d] |
|---|---|---|---|---|---|---|
| 1 | $MD_{43}D''_{6.8}M$ | 23.01 | 1850 | 100.09 | A | toluene |
| 2 | $MD_{60}D''_{15}M$ | 23.61 | 1042 | 83.46 | B | toluene |
| 3 | $MD_{60}D''_{15}M$ | 23.61 | 1242 | 100.15 | B | toluene |
| 4 | $MD_{60}D''_{15}M$ | 23.61 | 1442 | 116.84 | B | toluene |
| 5 | $MD_{60}D''_{15}M$ | 23.61 | 1642 | 133.54 | B | toluene |
| 6 | $MD_{60}D''_{15}M$ | 5.48 | 1242 | 24.05 | C[a] | toluene |
| 7 | $MD_{60}D''_{15}M$ | 5.48 | 1242 | 24.05 | C[b] | toluene |
| 8 | $MD_{60}D''_{15}M$ | 5.48 | 1242 | 24.05 | C[c] | toluene |
| 9 | $MD_{60}D''_{15}M$ | 4.57 | 1642 | 26.56 | C[a] | toluene |
| 10 | $MD_{60}D''_{15}M$ | 4.57 | 1642 | 26.56 | C[b] | toluene |
| 11 | $MD_{60}D''_{15}M$ | 4.57 | 1642 | 26.56 | C[c] | toluene |
| 12 | $MD_{60}D''_{15}M$ | 5.71 | 1242 | 25.08 | D[a] | toluene |
| 13 | $MD_{60}D''_{15}M$ | 5.71 | 1242 | 25.08 | D[b] | toluene |
| 14 | $MD_{60}D''_{15}M$ | 5.71 | 1242 | 25.08 | D[c] | toluene |
| 15 | $MD_{60}D''_{15}M$ | 5.71 | 1242 | 25.08 | E | toluene |
| 16 | $MD_{60}D''_{15}M$ | 4.57 | 1642 | 26.56 | E | toluene |
| 17 | $MD_{60}D''_{15}M$ | 5.71 | 1242 | 25.08 | B | DPG |
| 18 | $MD_{60}D''_{15}M$ | 4.57 | 1642 | 26.56 | B | DPG |
| 19 | $MD_{65}D''_{8}M$ | 35.33 | 1250 | 84.07 | F | toluene |
| 20 | $MD_{80}D''_{20}M$ | 9.38 | 1580 | 52.81 | C[d] | none |
| 21 | $MD_{80}D''_{20}M$ | 11.66 | 1242 | 49.84 | B | none |
| 22 | $MD_{80}D''_{20}M$ | 10.34 | 1442 | 51.56 | B | none |
| 23 | $MD_{80}D''_{20}M$ | 9.28 | 1642 | 52.93 | B | none |
| 24 | $MD_{80}D''_{20}M$ | 11.30 | 1292 | 50.31 | B | none |
| 25 | $MD_{80}D''_{20}M$ | 10.96 | 1342 | 50.75 | B | none |
| 26 | $MD_{80}D''_{20}M$ | 10.64 | 1392 | 51.17 | B | none |

Footnotes or Table 2:
[a] Silane fluid of structure $MD_xD'_yM$ (see Table 1 for details).
[b] Blend average molecular weight of the polyether blend.
[c] Components of polyether blend used in synthesis of surfactant. Symbolism: initial number followed by H indicates nominal % of ethylene oxide residues in a polyether based on ethylene oxide and propylene oxide; letter A indicates polyether is allyl-started; numbers following capital letter and preceeding "mw" indicate nominal molecular weight of the allyl polyether; letters OAc and OMe following "mw" indicate acetoxy and methoxy capping,#respectively; PEG stands for polyethylene glycol; PPG stands for polypropylene glycol.
Definitions of mixtures:
A = 40HA3200mw-OMe and APEG350mw-OMe
B = 40HA4000mw-OAc and 40HA550mw-OAc
C = 40HA4000mw-OAc, 40HA550mw-OAc, and APEG550-OAc; PE/APEG = (a) 24, (b) 11.5, (c) 7.3, (d) 1.6 (mole ratio)
D = 40HA4000mw-OAc, 40HA550mw-OAc, and APEG550mw-OH; PE/APEG = (a) 24, (b) 11.5, (c) 7.3 (mole ratio)
E = 40HA4000mw-OAc, 40HA550mw-OAc, and APPG400mw-OAc; PE/APPG = 7.3 (mole ratio)
F = 40HA4000mw-OAc and APEG550mw-OAc
[d] Surfactants prepared without solvent were not treated with sodium bicarbonate or stripped.

The surfactants of Table 2 were evaluated in the polyurethane foam formulation shown below in Table 3.

TABLE 3

Polyurethane Foam Test Formulation A

| Material | pphp (wt.) |
|---|---|
| NIAX ® Polyol 16-56 | 100 |
| Distilled water | 5.5 |
| NIAX ® Catalyst A-200 | 0.2 |
| Methylene chloride | 10.0 |
| Stannous octoate | 0.23 |
| Toluene diisocyanate(TDI)$^a$ | 69.44 |
| Surfactant | varied |

Footnote for Table 3:
$^a$The TDI was employed at a level of 112% of the stoichiometric amount.

Procedure for Preparation and Testing of Polyurethane Foams

The temperature of the laboratory, the polyol and the TDI were noted. A 32 oz paper cup was charged with NIAX ® Polyol 16-56 (250g), the surfactant to be evaluated, amine/water premix (containing 13.75 g of water and 0.5 g of NIAX ® Catalyst A-200), and methylene chloride (25 g). A brass mixing baffle with four equally spaced 0.5 inch wide vertical baffles was inserted into the cup, and the mixture was stirred for 15 seconds at 2150 rpm using a drill press with a marine blade. After 20 seconds stannous octoate (0.575 g, 0.46 ml) was added to the reaction mixture. A timer was started and the mixture was stirred for 8 seconds before adding 80/20 toluene diisocyanate (173.6 g, 112% of the stoichiometric amount) with continuous stirring for an additional seven seconds. The stirrer was then stopped and the reaction mixture was dumped into a preweighed five gallon plastic bucket. The cup was kept inverted over the bucket for a total of ten seconds. As the foam began to rise, a small 1"×1" square of aluminum foil was placed on its top to support a fixed length wire which floats in a tube calibrated for recording foam heights in inches. The maximum height of the foam at blowoff, the amount of top collapse after one minute, and the rise time were recorded. The foam was placed in an oven at 120° C. for about ten minutes, and then was allowed to cool to room temperature overnight. The height of the foam was measured in cm, then the foam was cut open using a band saw and samples were taken for evaluation. 2"×2"×1" pieces were cut from the center, 1.5 inches below the top, and 1.5 inches above the bottom of the foam. For each cube the density was measured and the breathability through the foam was determined using a Nopco breathability apparatus (adjusted back pressure to 0.5 inches of water and read air flow in standard cubic feet per minute). This device is described in the article by Jones and Fesman, J. Cellular Plastics, 1, 3–19 (1965), and the relevant portions of this reference are hereby incorporated by reference.

Profiles of final foam height, foam breathability, foam top collapse and foam density versus surfactant concentration (in pphp) were plotted for each surfactant. Surfactant potency was defined as the surfactant concentration in pphp required to give 35 cm of foam height (normalized to a constant temperature) after the initial top collapse (1 minute after blowoff). Foam height was defined as the resulting height of the foam (normalized to a constant temperature) after the initial top collapse obtained using the surfactant mother liquor at a concentration of 1.25 pphp.

Test results from experimental foams made according to Test Formulation A are presented in Table 4 below.

TABLE 4

Foam Test Results, Test Formulation A

| Surfactant Number | Amount (pphp)$^a$ | cm. Top Collapse$^b$ | Breathability$^c$ | Height of Rise, cm$^d$ |
|---|---|---|---|---|
| UCC&P I$^e$ | 0.40 | 7.11 | — | 31.44 |
| UCC&P I$^e$ | 0.45 | 4.83 | 4.25 | 33.52 |
| UCC&P I$^e$ | 0.85 | 4.06 | 2.30 | 34.79 |
| UCC&P I$^e$ | 1.25 | 2.29 | 1.80 | 35.56 |
| UCC&P II$^e$ | 0.45 | 3.05 | 6.25 | 37.05 |
| UCC&P II$^e$ | 0.85 | 1.78 | 6.25 | 39.32 |
| UCC&P II$^e$ | 1.25 | 1.02 | 6.50 | 39.58 |
| Compound A | 0.45 | 2.80 | 6.00 | 36.50 |
| Compound A | 0.85 | 1.20 | 5.30 | 38.80 |
| Compound A | 1.25 | 1.00 | 4.50 | 39.50 |
| 1 | 0.45 | 3.00 | 4.00 | 35.90 |
| 1 | 0.70 | 1.25 | 4.50 | 38.60 |
| 1 | 1.25 | 0.89 | 4.50 | 39.00 |
| 2 | 0.45 | 7.11 | 8.00 | 32.49 |
| 2 | 0.85 | 4.57 | 9.00 | 35.83 |
| 2 | 1.25 | 3.30 | 9.50 | 37.10 |
| 3 | 0.35 | 5.59 | — | 34.81 |
| 3 | 0.45 | 3.30 | 6.50 | 36.60 |
| 3 | 0.85 | 2.54 | 6.50 | 38.36 |
| 3 | 1.25 | 2.29 | 7.00 | 39.11 |
| 4 | 0.35 | 40 | — | 0.0 |
| 4 | 0.45 | 3.05 | 4.50 | 37.35 |
| 4 | 0.85 | 2.29 | 4.50 | 39.11 |
| 4 | 1.25 | 1.78 | 4.00 | 39.82 |
| 5 | 0.45 | 19.05 | — | 21.10 |
| 5 | 0.55 | 3.30 | 1.60 | 36.85 |
| 5 | 0.65 | 2.29 | 2.40 | 38.06 |
| 5 | 0.85 | 2.29 | 2.55 | 38.56 |
| 5 | 1.25 | 2.03 | 2.15 | 39.32 |
| 6 | 0.45 | 5.59 | 6.00 | 33.01 |
| 6 | 0.65 | 4.32 | 6.00 | 33.78 |
| 6 | 1.25 | 40 | — | 0.0 |
| 6 | 1.25 | 5.59 | — | 31.51 |
| 6 | 2.00 | 7.11 | — | 29.99 |
| 7 | 1.25 | 40 | — | 0.0 |
| 7 | 1.25 | 3.05 | 5.50 | 32.25 |
| 8 | 1.25 | 40 | — | 0.0 |
| 8 | 1.25 | 3.81 | 5.25 | 34.79 |
| 9 | 0.45 | 40 | — | 0.0 |
| 9 | 0.65 | 5.08 | 1.50 | 32.97 |
| 9 | 0.85 | 2.29 | 2.20 | 37.06 |
| 9 | 1.25 | 2.03 | 2.30 | 37.32 |
| 10 | 0.45 | 40 | — | 0.0 |
| 10 | 0.65 | 3.05 | 3.75 | 37.10 |
| 10 | 0.85 | 2.03 | 4.00 | 38.12 |
| 10 | 1.25 | 1.52 | 3.50 | 38.33 |
| 11 | 0.45 | 40 | — | 0.0 |
| 11 | 0.65 | 3.05 | 4.50 | 37.55 |
| 11 | 0.85 | 2.54 | 4.50 | 38.56 |
| 11 | 1.25 | 2.03 | 4.00 | 39.07 |
| 12 | 0.85 | 5.60 | 3.75 | 31.75 |
| 12 | 1.25 | 4.80 | 4.75 | 32.75 |
| 13 | 1.25 | 40 | — | 0.0 |
| 14 | 0.40 | 40 | — | 0.0 |
| 14 | 1.25 | 40 | — | 0.0 |
| 15 | 0.45 | 5.80 | 6.25 | 33.60 |
| 15 | 0.55 | 3.60 | 7.50 | 36.80 |
| 15 | 0.85 | 3.00 | 7.75 | 36.90 |
| 15 | 1.25 | 3.30 | 8.50 | 37.30 |
| 16 | 0.85 | 7.40 | — | 30.45 |
| 16 | 1.25 | 6.10 | — | 31.95 |
| 17 | 0.36 | 13.20 | — | 25.40 |
| 17 | 0.44 | 2.80 | 5.25 | 36.30 |
| 17 | 0.52 | 2.50 | 5.00 | 36.90 |
| 17 | 0.68 | 2.50 | 5.50 | 36.90 |
| 17 | 1.00 | 2.30 | 5.50 | 37.30 |
| 17 | 1.25 | 1.78 | 5.75 | 39.59 |
| 18 | 0.36 | 40 | — | 0.0 |
| 18 | 0.44 | 3.00 | 1.20 | 35.85 |
| 18 | 0.52 | 2.00 | 1.65 | 37.35 |
| 18 | 0.68 | 1.80 | 1.55 | 38.05 |
| 18 | 1.00 | 1.00 | 2.20 | 39.15 |
| 18 | 1.25 | 1.27 | 1.95 | 40.10 |
| 19 | 0.45 | 3.05 | 5.00 | 35.04 |
| 19 | 0.45 | 3.30 | 5.00 | 34.54 |

TABLE 4-continued

Foam Test Results, Test Formulation A

| Surfactant Number | Amount (pphp)[a] | cm. Top Collapse[b] | Breath-ability[c] | Height of Rise, cm[d] |
|---|---|---|---|---|
| 19 | 0.45 | 2.54 | 5.00 | 35.30 |
| 19 | 0.55 | 2.03 | 4.75 | 36.32 |
| 19 | 0.55 | 2.29 | 4.75 | 35.81 |
| 19 | 0.55 | 2.29 | 4.75 | 36.06 |
| 19 | 0.70 | 2.29 | 4.50 | 36.82 |
| 19 | 0.70 | 1.52 | 4.50 | 37.08 |
| 19 | 0.70 | 1.52 | 4.50 | 36.58 |
| 19 | 1.25 | 0.51 | 4.75 | 39.11 |
| 19 | 1.25 | 0.51 | 4.75 | 39.11 |
| 19 | 1.25 | 0.76 | 4.50 | 38.86 |
| 20 | 0.35 | 40 | — | 0.0 |
| 20 | 0.45 | 3.30 | 0.90 | 36.80 |
| 20 | 0.85 | 2.54 | 0.95 | 37.81 |
| 20 | 1.25 | 2.79 | 0.80 | 37.30 |
| 21 | 0.35 | 8.89 | — | 30.70 |
| 21 | 0.45 | 3.81 | 7.25 | 36.55 |
| 21 | 0.85 | 3.56 | 6.75 | 37.31 |
| 21 | 1.25 | 2.54 | 7.00 | 37.82 |
| 22 | 0.30 | 40 | — | 0.0 |
| 22 | 0.35 | 4.32 | 2.30 | 34.01 |
| 22 | 0.45 | 3.81 | 2.55 | 35.53 |
| 22 | 0.85 | 2.29 | 2.55 | 37.31 |
| 22 | 1.25 | 2.29 | 1.65 | 37.31 |
| 23 | 0.25 | 40 | — | 0.0 |
| 23 | 0.30 | 5.33 | 1.35 | 32.99 |
| 23 | 0.35 | 3.81 | 1.20 | 34.77 |
| 23 | 0.45 | 3.05 | 1.30 | 36.29 |
| 23 | 0.85 | 2.54 | 1.00 | 36.29 |
| 23 | 1.25 | 3.30 | 0.85 | 34.51 |
| 24 | 0.40 | 40 | — | 0.0 |
| 24 | 0.45 | 5.30 | 6.25 | 34.30 |
| 24 | 0.85 | 2.29 | 7.50 | 38.11 |
| 24 | 1.25 | 2.29 | 6.50 | 38.33 |
| 25 | 0.45 | 5.59 | 4.25 | 33.01 |
| 25 | 0.85 | 2.03 | 6.25 | 38.57 |
| 25 | 1.25 | 1.27 | 3.25 | 38.63 |
| 26 | 0.45 | 6.86 | — | 31.99 |
| 26 | 0.85 | 2.54 | 3.50 | 37.07 |
| 26 | 1.25 | 2.80 | 2.60 | 36.30 |

Footnotes for Table 4:
[a] amount of surfactant is expressed in parts per hundred parts of polyol.
[b] top collapse in cm, measured one minute after blow-off.
[c] breathability measured as air flow in standard cubic feet per minute, through a middle-cut sample.
[d] height of foam rise in cm one minute after blow-off and normalized to 25° C.
[e] this is a prior art surfactant, for comparison.

It will be seen from Table 4 that the surfactants of the invention afford generally flat breathability profiles as a function of surfactant concentrations.

Additional examples of surfactants of the invention were prepared as follows. In a 250 ml three necked flask fitted with a heating mantle, mechanical stirrer, thermometer, Dean-Stark trap, Friedrich condenser and nitrogen sparge tube were combined amounts as shown in Table 5 of an allyl started, acetoxy endcapped polyoxyalkylene polymer having an average molecular weight of about 590 and containing about 40 weight percent oxyethylene groups and about 60 weight percent oxypropylene groups (in the terminology previously employed, this is a 40HA590mw-OAc polyether and is designated in Table 5 as polyether A), an allyl started, acetoxy endcapped polyoxyalkylene polymer with an average molecular weight of about 3987 and containing about 40 weight percent oxyethylene groups and about 60 weight percent oxypropylene groups (in the terminology previously employed, this is a 40HA4000mw-OAc polyether and is designated in Table 5 as polyether B), and 25 grams of dipropylene glycol (DPG). Then an amount as shown in Table 5 of a poly((dimethyl)(hydridomethyl))siloxane polymer prepared in the same manner as set forth above and having the average formula $MD_xD'_yM$ where x and y are as indicated in Table 5 were added. This mixture was heated to about 75° C. and 0.25 ml of an $H_2PtCl_6$/ethanol solution (10 mg Pt/ml) were added. Heating at 75° C. was continued for one hour, after which the mixture was cooled and the product collected. The product in each case was a clear amber-colored liquid.

TABLE 5

Ingredients for Surfactant Syntheses

| Product Number | Siloxane Structure | grams of Siloxane | grams of Poly-ether A | grams of Poly-ether B |
|---|---|---|---|---|
| 27 | $MD_{66.5}D'_{18.5}M$ | 10.6 | 18.0 | 71.4 |
| 28 | $MD_{69.5}D'_{15.5}M$ | 13.5 | 20.1 | 66.4 |
| 29 | $MD_{69.5}D'_{15.5}M$ | 13.5 | 20.1 | 66.4 |
| 30 | $MD_{70}D'_9M$ | 17.9 | 13.3 | 68.9 |
| 31 | $MD_{71.9}D'_{13.1}M$ | 15.6 | 19.6 | 64.8 |
| 32 | $MD_{73}D'_{12}M$ | 13.9 | 13.9 | 72.2 |
| 33 | $MD_{73}D'_{12}M$ | 17.7 | 20.9 | 61.4 |
| 34 | $MD_{76}D'_9M$ | 19.9 | 16.1 | 64.0 |
| 35 | $MD_{80}D'_5M$ | 28.3 | 11.6 | 60.1 |

Several of the surfactants listed in Table 5 above were evaluated in the flame retardant polyurethane foam test formulation B shown below:

TABLE 6

Polyurethane Foam Test Formulation B

| Material | pphp (wt.) |
|---|---|
| NIAX ® Polyol 16-56 | 100.0 |
| Distilled water | 4.8 |
| Bis-(2-dimethylamino)ether | 0.01 |
| Triethylene Diamine | 0.01 |
| Dimethylaminoethoxyethanol | 0.03 |
| Dipropylene Glycol | 0.05 |
| Methylene Chloride | 5.0 |
| Stannous Octoate | 0.23 |
| Toluene diisocyanate (80/20)[a] | 60.9 |
| Thermolin 101 Flame Retardant | varied |
| Test I | 6.0 |
| Test II | 8.0 |
| Test III | 10.0 |
| Test IV | 6.0 |
| Polysiloxane-polyoxyalkylene Surfactants of Table 5 | varied |
| Test I | 1.25 |
| Test II | 1.25 |
| Test III | 1.25 |
| Test IV | 2.50 |

Footnote for Table 6:
[a] The TDI was used at a level of 110% of the stoichiometric amount.

Using the products of Test Formulation B above, the following flammability test results were obtained following the California Bulletin 117A protocol.

TABLE 7

Flammability Test Results, Test Formulation B

| Surfactant Number | Foam Test | Length of Char. (in.) | After-Flame (sec) | Pass/Fail |
|---|---|---|---|---|
| 27 | I | 2.2 | 0.0 | pass |
| 27 | IV | 3.9 | 0.4 | pass |
| 32 | I | 4.1 | 1.0 | pass |
| 32 | II | 2.8 | 0.1 | pass |
| 32 | III | 2.3 | 0.0 | pass |
| 34 | I | 4.7 | 2.8 | retest |
| 34 | II | 2.9 | 0.6 | pass |
| 34 | III | 3.2 | 1.2 | pass |
| 35 | I | 12.0 | 16.7 | fail |
| 35 | II | 12.0 | 19.7 | fail |
| 35 | III | 12.0 | 19.0 | fail |

These results indicate that a surfactant which has a high D/D" ratio is not as good in flame retardant foam compositions as surfactants having lower D/D" ratios.

Several of the surfactants listed in Table 5 above were evaluated in the flame retardant polyurethane foam Test Formulation C shown in Table 8. This is similar to Test Formulation B except that the levels of flame retardant and surfactants are somewhat different.:

TABLE 8

| Polyurethane Foam Test Formulation C | |
|---|---|
| Material | pphp (wt.) |
| NIAX ® Polyol 16-56 | 100.0 |
| Distilled water | 4.8 |
| Bis-(2-dimethylamino)ether | 0.01 |
| Triethylene Diamine | 0.01 |
| Dimethylaminoethoxyethanol | 0.03 |
| Dipropylene Glycol | 0.05 |
| Methylene Chloride | 5.0 |
| Stannous Octoate | 0.23 |
| Toluene diisocyanate (80/20)[a] | 60.9 |
| Thermolin 101 Flame Retardant | varied |
| Test I | 5.0 |
| Test II | 7.0 |
| Test III | 5.0 |
| Test IV | 7.0 |
| Polysiloxane-polyoxyalkylene Surfactants of Table 5 | varied |
| Test I | 1.25 |
| Test II | 1.25 |
| Test III | 1.56 |
| Test IV | 1.56 |

Footnote for Table 8:
[a]The TDI was used at a level of 110% of the stoichiometric amount.

In Table 9 below are presented characterizing data for a number of the foams produced from Test Formulation C above. Control materials are also presented for comparison.

TABLE 9

| Characterizing Data for Foams of Test Formulation C | | | | |
|---|---|---|---|---|
| Surfactant Number[a] | Foam Test | Height of Rise, cm. | cm of Top Collapse | Breathability[c] |
| UCC&P III | IV | 35.3 | 0.00 | 2.3 |
| UCC&P III | IV | 36.1 | 0.00 | 1.7 |
| UCC&P IV | I | 36.3 | 0.00 | 2.0 |
| UCC&P IV | II | 36.3 | 0.00 | 2.3 |
| 28 | I | 36.6 | 0.80 | 2.8 |
| 28 | II | 36.6 | 0.50 | 3.5 |
| 29 | I | 37.7 | 0.60 | 4.0 |
| 29 | II | 37.6 | 0.50 | 4.0 |
| 31 | I | 37.5 | −0.34[b] | 2.0 |
| 31 | II | 37.6 | 0.00 | 2.1 |
| 33 | I | 36.1 | 0.50 | 6.3 |
| 33 | II | 36.2 | 0.60 | 6.0 |
| 34 | I | 34.8 | 4.10 | 7.5 |
| 34 | II | 34.5 | 4.30 | 7.5 |

Footnotes for Table 9:
[a]Controls UCC&P III and UCC&P IV are proprietary commercial silicone surfactant products of UCC&P, generally used in flame retardant applications.
[b]negative top collapse indicates that the foam bun rose rather than collapsed after blow-off.
[c]Breathability in standard cubic feet per minute.

The results of Table 9 indicate that the surfactants of the invention afford breathabilities generally as good as or better than those of the controls.

Using the products of Test Formulation C above, the flammability test results shown in Table 10 were obtained following the California Bulletin 117A protocol. A control is included for comparison.

TABLE 10

| Flammability Test Results, Test Formulation C | | | | |
|---|---|---|---|---|
| Surfactant Number | Foam Test | Length of Char. (in.) | After-Flame (sec) | Pass/Fail |
| UCC&P V[a] | I | 5.6 | 5.4 | fail |
| UCC&P V[a] | II | 2.6 | 0.0 | pass |
| 29 | I | 3.7 | 0.0 | pass |
| 29 | II | 3.2 | 0.0 | pass |
| 31 | I | 4.5 | 2.1 | pass |
| 31 | II | 2.1 | 0.0 | pass |
| 33 | I | 5.8 | 2.2 | pass |
| 33 | II | 3.5 | 0.0 | pass |
| 34 | I | 8.7 | — | fail |
| 34 | II | 4.2 | 1.0 | pass |

Footnote for Table 10:
[a]UCC&P V is a proprietary commercial product of UCC&P, and is a silicone surfactant having polyether pendant groups.

Several of the surfactants listed in Table 5 above were evaluated in the flame retardant polyurethane foam Test Formulation D shown in Table 11. This is similar to Test Formulation B except that the levels of flame retardant and surfactants are somewhat different.

TABLE 11

| Polyurethane Foam Test Formulation D | |
|---|---|
| Material | pphp (wt.) |
| NIAX ® Polyol 16-56 | 100.0 |
| Distilled water | 4.8 |
| Bis-(2-dimethylamino)ether | 0.01 |
| Triethylene Diamine | 0.01 |
| Dimethylaminoethoxyethanol | 0.03 |
| Dipropylene Glycol | 0.05 |
| Methylene Chloride | 5.0 |
| Stannous Octoate | 0.23 |
| Toluene diisocyanate (80/20)[a] | 60.9 |
| Thermolin 101 Flame Retardant | varied |
| Test I | 5.0 |
| Test II | 5.0 |
| Test III | 7.0 |
| Test IV | 7.0 |
| Polysiloxane-polyoxyalkylene Surfactants of Table 5 | varied |
| Test I | 0.88 |
| Test II | 1.58 |
| Test III | 0.88 |
| Test IV | 1.58 |

Footnote for Table 11:
[a]The TDI was used at a level of 110% of the stoichiometric amount.

In Table 12 below are presented characterizing data for a number of the foams produced from Test Formulation D above. A control material is also presented for comparison.

TABLE 12

| Characterizing Data for Foams of Test Formulation D | | | | |
|---|---|---|---|---|
| Surfactant Number | Foam Test | Density of Foam (pcf) | cm of Top Collapse | Breathability[b] |
| UCC&P VI[a] | I | 1.24 | 0.30 | 0.42 |
| UCC&P VI[a] | II | 1.23 | 0.33 | 0.55 |
| UCC&P VI[a] | III | 1.26 | 0.44 | 0.47 |
| UCC&P VI[a] | IV | 1.25 | 0.00 | 0.56 |
| 28 | I | 1.27 | 2.41 | 0.51 |
| 28 | II | 1.20 | 0.00 | 0.65 |
| 28 | III | 1.21 | 1.00 | 0.54 |
| 28 | IV | 1.21 | 0.44 | 0.58 |
| 30 | I | 1.19 | 0.00 | 0.57 |
| 30 | II | 1.20 | 0.75 | 0.69 |
| 30 | III | 1.21 | 0.54 | 0.55 |
| 30 | IV | 1.20 | 0.00 | 0.68 |
| 31 | I | 1.25 | 0.00 | 0.84 |
| 31 | II | 1.19 | 0.32 | 0.86 |
| 31 | III | 1.21 | 0.00 | 0.88 |

TABLE 12-continued

Characterizing Data for Foams of Test Formulation D

| Surfactant Number | Foam Test | Density of Foam (pcf) | cm of Top Collapse | Breathability[b] |
|---|---|---|---|---|
| 31 | IV | 1.21 | 0.97 | 0.91 |

Footnotes for Table 12:
[a]Control UCC&P VI is a proprietary commercial silicone surfactant product of UCC&P, generally used in flame retardant applications.
[b]Breathability by Magnahelic porosity measurement; results expressed in pressure drop in inches of water. A lower value represents a more open foam.

Using the products of Test Formulation D above, the flammability test results shown in Table 13 were obtained following the California Bulletin 117A protocol. A control is included for comparison.

TABLE 13

Flammability Test Results, Test Formulation D

| Surfactant Number | Foam Test | Length of Char. (in.) | After-Flame (sec) | Pass/Fail |
|---|---|---|---|---|
| UCC&P VI[a] | I | 6.5 | 5.1 | fail |
| UCC&P VI[a] | II | 8.7 | 9.1 | fail |
| UCC&P VI[a] | III | 5.3 | 2.7 | retest |
| UCC&P VI[a] | IV | 4.9 | 2.1 | pass |
| 28 | I | 2.4 | 3.9 | pass |
| 28 | II | 3.7 | 0.0 | pass |
| 28 | III | 4.0 | 1.0 | pass |
| 28 | IV | 2.9 | 0.3 | pass |
| 30 | I | 5.1 | 3.2 | fail |
| 30 | II | 7.4 | 7.3 | fail |
| 30 | III | 4.3 | 0.3 | pass |
| 30 | IV | 7.2 | 3.6 | fail |
| 31 | I | 3.3 | 0.4 | pass |
| 31 | II | 4.0 | 0.8 | pass |
| 31 | III | 3.4 | 0.0 | pass |
| 31 | IV | 3.4 | 0.0 | pass |

Footnote for Table 13:
[a]UCC&P VI is a proprietary commercial product of UCC&P, and is a silicone surfactant having polyether pendant groups.

Two of the surfactants of the invention were evaluated in polyurethane foam test formulation E shown in Table 14. This is a flame retardant foam formulation employed in Europe. The trials were run on an industrial scale foam line.

TABLE 14

Polyurethane Foam Test Formulation E

| Material | pphp (wt.)[a] |
|---|---|
| Compound B (Polyol) | 100.0 |
| Water | 3.3 |
| NIAX catalyst A-1 | 0.06 |
| Polycat 77 amine catalyst | 0.06 |
| Toluene diisocyanate (80/20) | 110 index[d] |
| Silicone surfactant | varied |
| Test I Compound A | 1.0 |
| Test II 36[b] | 1.0 |
| Test III 37[c] | 0.9 |
| Stannous Octoate | varied |
| Test I | 0.215 |
| Test II | 0.24 |
| Test III | 0.23 |

Footnotes for Table 14:
[a]parts per hundred parts of polyol.
[b]This surfactant is Surfactant No. 1 in diluted form.
[c]This surfactant is Surfactant No. 19 in diluted form.
[d]TDI was employed at a level 110% of stoichiometric.

Foams prepared using test formulation E were sampled at the top, middle, and bottom of the materials, and the breathabilities of the test samples were measured in the normal way. Results are summarized in Table 15, and show that the surfactants of the invention are superior to the comparative material in terms of breathability.

TABLE 15

Breathability[a] of Foams made with Test Formulation E

| Surfactant | Top | Middle | Bottom |
|---|---|---|---|
| 37 | 4.0 | 4.0 | 3.0 |
| 36 | 4.5 | 4.3 | 2.5 |
| Compound A | 3.0 | 3.0 | 1.9 |

Footnote for Table 15:
[a]standard cubic feet per minute.

Two of the surfactants of the invention were evaluated in polyurethane foam test formulation F shown in Table 16. This is a flame retardant foam formulation employed in Europe.

TABLE 16

Polyurethane Foam Test Formulation F

| Material | pphp (wt.)[a] |
|---|---|
| Compound C (Polyol) | 100.0 |
| Water | 3.5 |
| NIAX catalyst A-1 | 0.08 |
| Toluene diisocyanate (80/20) | 105 index[c] |
| Blowing agent U-11 | 16.00 |
| Thermolin 101 | 2.00 |
| Silicone surfactant[b] | varied |
| Test I Compound A | 0.6 |
| Test II 36 | 0.6 |
| Test III Compound D | 0.6 |
| Stannous Octoate | varied |
| Test I | 0.16 |
| Test II | 0.16 |
| Test III | 0.16 |

Footnotes for Table 16:
[a]parts per hundred parts of polyol.
[b]Surfactants compared at equivalent copolymer concentrations.
[c]TDI was employed at a level 105% of stoichiometric.

The foams prepared according to test formulation F above were tested for flamability in the Motor Vehicle Safety Standard (MVSS) 30L Test. Results are shown in Table 17 below, and indicate that the surfactants of the invention are superior to the standard non-flame retardant surfactant and the prior art flame retardant surfactant in terms of flame retardancy.

TABLE 17

Flammability Test Results, Test Formulation F

| Surfactant | Char Length |
|---|---|
| 36 | 29 cm |
| Compound A | 52 cm |
| Compound D | 230 cm |

Preparation of MD$_x$D'$_y$M Fluids

These materials are prepared in the same manner as the MD$_x$D'$_y$M fluids discussed above, except that dihydridotetramethyldisiloxane (M'M') is employed instead of hexamethyldisiloxane (MM). The amounts of reagents which would be used in the preparation of several of these materials are shown in Table 18.

TABLE 18

Reagents Used for Preparation of MD$_x$D'$_y$M Fluids

| Product | M'M' (g) | cyclic D4 (g) | L-31 (g) | H$_2$SO$_4$ (g) |
|---|---|---|---|---|
| MD$_{43}$D'$_{6.8}$M | 2.9 | 82.18 | 14.31 | 2.75 |
| MD$_{60}$D'$_{15}$M | 1.64 | 78.97 | 19.04 | 2.75 |
| MD$_{65}$D'$_{8}$M | 1.96 | 86.32 | 11.30 | 2.75 |

Preparation of M*D$_x$D''$_y$M* Surfactants

These materials are prepared in the same manner as the MDxDΔyM surfactants discussed above, with the exception that the appropriate $M^{}D_xD''_yM^{}$ fluid is employed instead of an $MD_xD''_yM$ fluid. Amounts of reagents which could be employed in the synthesis of these surfactants are listed in Table 19.

TABLE 19

Specifics of $M^*D_xD''_yM^*$ Surfactant Syntheses

| No. | Structure | g SiH Fluid[a] | Polyethers BAMW[b] | grams | Blend[c] | Solvent[d] |
|---|---|---|---|---|---|---|
| 38 | $M^*D_{43}D''_{6.8}M^*$ | 19.25 | 1850 | 104.98 | A | toluene |
| 39 | $M^*D_{60}D''_{15}M^*$ | 21.06 | 1242 | 102.62 | B | toluene |
| 3 | $M^*D_{60}D''_{15}M^*$ | 30.88 | 1250 | 89.86 | C | toluene |

Footnotes for Table 19:
[a]Silane fluid of structure $M^{}D_xD'_yM^{}$ (see Table 18 for details).
[b]Blend average molecular weight of the polyether blend.
[c]Components of polyether blend used in synthesis of surfactant. Symbolism: initial number followed by H indicates nominal % of ethylene oxide residues in a polyether based on ethylene oxide and propylene oxide; letter A indicates polyether is allyl-started; numbers following capital letter and preceeding "mw" indicate nominal molecular weight of the allyl polyether; letters OAc and OMe following "mw" indicate acetoxy and methoxy capping, respectively; PEG stands for polyethylene glycol.
Definitions of mixtures:
A = 40HA3200mw-OMe and APEG350mw-OMe
B = 40HA4000mw-OAc and 40HA550mw-OAc
C = 40HA4000mw-OAc and APEG550mw-OAc Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

We claim:

1. A composition of matter having the generalized average formula $$M^*D_xD''_yM^*$$

wherein
M* represents $(CH_3)_3SiO_{1/2}$ or $R(CH_3)_2SiO_{1/2}$;
D represents $(CH_3)_2SiO_{2/2}$;
D" represents $(CH_3)(R)SiO_{2/2}$;
x is 40–80;
y is 5–20; and
in the above formulae for M* and D",
R is a polyether-containing substituent derived from a $C_nH_{2n}$—1-started polyether and is selected from the group consisting of:
(1) —$C_nH_{2n}O(C_2H_4O)_a(C_3H_6O)_bR''$ moieties having average atomic masses in the range 1500–6000, and wherein
n is 3–4;
a is a number such that ethylene oxide residues constitute 30–50% by weight of the alkylene oxide residues of the polyether;
b is a number such that propylene oxide residues constitute 70–50% by weight of the alkylene oxide residues of the polyether;
R" represents H, an alkyl group of 1–4 carbon atoms, or —$C(O)CH_3$; and
(2) —$C_{n'}H_{2n'}O(C_2H_4O)_{a'}(C_3H_6O)_{b'}R''$ moieties having average atomic masses in the range 300–750, and wherein
n' is 3–4;
a' is 0 to a number such that ethylene oxide residues constitute 100% by weight of the alkylene oxide residues of the polyether; and b' is 0 to a number such that propylene oxide residues constitute 100% by weight of the alkylene oxide residues of the polyether;
with the proviso that at least one of a' and b' must be finite; and
R" is as defined above; and
with the further provisos that the composition $M^*D_xD''_yM^*$ contains polyether-containing substituents R having average atomic masses in the range 1500–6000 and polyether-containing substituents R having average atomic masses in the range 300–750, and that
the overall average atomic mass of the $C_nH_{2n-1}$-started polyethers from which the polyether-containing substituents R in the composition $M^*D_xD''_yM^*$ are derived is in the range 1000–1800.

2. The composition of claim 1 wherein x is 41–45 and y is 5.5–10.

3. The composition of claim 2 wherein x is about 43 and y is about 6.8.

4. The composition of claim 1 wherein x is 58–62 and y is 7.5–15.

5. The composition of claim 4 wherein x is about 60 and y is about 15.

6. The composition of claim 1 wherein x is 63–67 and y is 8–16.

7. The composition of claim 6 wherein x is about 65 and y is about 8–10.

8. The composition of claim 1 wherein the polyether-containing substituents R having average atomic masses in the range 1500–6000 are selected from the group consisting of: —$C_3H_6O$ $(C_2H_4O)_a(C_3H_6O)_bR''$ moieties containing approximately 40% by weight of ethylene oxide residues and having an average atomic mass of approximately 4000, and —$C_3H_6O$ $(C_2H_4O)_a(C_3H_6O)_bR''$ moieties containing approximately 40% by weight of ethylene oxide residues and having an average atomic mass of approximately 3200.

9. The composition of claim 1 wherein the polyether-containing substituents R having average atomic masses in the range 300–750 are selected from the group consisting of: —$C_3H_6O$ $(C_2H_4O)_a(C_3H_6O)_oR''$ moieties, and —$C_3H_6O$ $(C_2H_4O)_a(C_3H_6O)_bR''$ moieties containing approximately 40% by weight of ethylene oxide residues and having average atomic masses in the range 400–600.

10. The composition of claim 1 wherein the overall average atomic mass of the $C_nH_{2n-1}$-started polyethers from which the polyether-containing substituents R in the composition $M^*D_xD''_yM^*$ are derived is in the blend average molecular weight range 1100–1400.

11. A polyurethane foam composition comprising:
(a) a polyether polyol containing an average of more than 2 hydroxyl groups per molecule;
(b) an organic diisocyanate;
(c) at least one catalyst for production of polyurethane foam;
(d) a blowing agent; and
(e) a siloxane-oxyalkylene copolymer having the generalized average formula $$M^*D_xD''_yM^*$$

wherein
M* represents $(CH_3)_3SiO_{1/2}$ or $R(CH_3)_2SiO_{1/2}$;
D repersents $(CH_3)_2SiO_{2/2}$;
D" represents $(CH_3)(R)SiO_{2/2}$;

x is 40–80;

y is 5–20; and in the above formulae for M* and D'',

R is a polyether-containing substituent derived from a $C_nH_{2n-1}$-started polyether and is selected from the group consisting of:

(1) $-C_nH_{2n}O(C_2H_4O)_a(C_3H_6O)_bR''$ moieties having average atomic masses in the range 1500–6000, and wherein n is 3–4;

a is a number such that ethylene oxide residues constitute 30–50% by weight of the alkylene oxide residues of the polyether;

b is a number such that propylene oxide residues constitute 70–50% by weight of the alkylene oxide residues of the polyether;

R'' represents H, an alkyl group of 1–4 carbon atoms, or $-C(O)CH_3$; and (2) $-C_{n'}H_{2n'}O(C_2H_4O)_{a'}(C_3H_6O)_{b'}R''$ moieties having average atomic masses in the range 300–750, and wherein n' is 3–4;

a' is 0 to a number such that ethylene oxide residues constitute 100% by weight of the alkylene oxide residues of the polyether; and b' is 0 to a number such that propylene oxide residues constitute 100% by weight of the alkylene oxide residues of the polyether;

with the proviso that at least one of a' and b' must be finite; and

R'' is as defined above; and with the further provisos that the composition $M^*D_xD''_yM^*$ contains polyether-containing substituents R having average atomic masses in the range 1500–6000 and polyether-containing substituents R having average atomic masses in the range 300–750, and that the overall average atomic mass of the $C_nH_{2n-1}$-started polyethers from which the polyether-containing substituents R in the composition $M^*D_xD''_yM^*$ are derived is in the range 1000–1800.

12. A method of preparing polyurethane foam, which comprises the steps of:

(1) preparing a mixture comprising:

(a) a polyether polyol containing an average of more than 2 hydroxyl groups per molecule;

(b) an organic diisocyanate;

(c) at least one catalyst for production of polyurethane foam;

(d) a blowing agent; and (e) a siloxane-oxyalkylene copolymer having the generalized average formula $M^*D_xD''_yM^*$ wherein M* represents $(CH_3)_3SiO_{1/2}$ or $R(CH_3)_2SiO_{1/2}$;

D represents $(CH_3)_2SiO_{2/2}$;

D'' represents $(CH_3)(R)SiO_{2/2}$;

x is 40–80;

y is 5–20; and in the above formulae for M* and D'',

R is a polyether-containing substituent derived from a $C_nH_{2n-1}$-started polyether and is selected from the group consisting of:

(1) $-C_nH_{2n}O(C_2H_4O)_a(C_3H_6O)_bR''$ moieties having average atomic masses in the range 1500–6000, and wherein n is 3–4;

a is a number such that ethylene oxide residues constitute 30–50% by weight of the alkylene oxide residues of the polyether;

b is a number such that propylene oxide residues constitute 70–50% by weight of the alkylene oxide residues of the polyether;

R'' represents H, an alkyl group of 1–4 carbon atoms, or $-C(O)CH_3$; and (2) $-C_{n'}H_{2n'}O(C_2H_4O)_{a'}(C_3H_6O)_{b'}R''$ moieties having average atomic masses in the range 300–750, and wherein n' is 3–4;

a' is 0 to a number such that ethylene oxide residues constitute 100% by weight of the alkylene oxide residues of the polyether; and b' is 0 to a number such that propylene oxide residues constitute 100% by weight of the alkylene oxide residues of the polyether;

with the proviso that at least one of a' and b' must be finite; and

R'' is as defined above; and with the further provisos that the composition $M^*D_xD''_yM^*$ contains polyether-containing substituents R having average atomic masses in the range 1500–6000 and polyether-containing substituents R having average atomic masses in the range 300–750, and that the overall average atomic mass of the $C_nH_{2n-1}$-started polyethers from which the polyether-containing substituents R in the composition $M^*D_xD''_yM^*$ are derived is in the range 1000–1800;

(2) allowing the mixture to foam; and (3) curing the foamed composition.

13. Polyurethane foam prepared by the process of claim 12.

* * * * *